United States Patent [19]

Tamm

[11] 4,082,697

[45] Apr. 4, 1978

[54] CATALYST CARRIER, ITS METHOD OF PREPARATION AND A REFORMING CATALYST SUPPORTED ON THE CARRIER

[75] Inventor: Paul W. Tamm, Oakland, Calif.

[73] Assignee: Chevron Research Company, San Francisco, Calif.

[21] Appl. No.: 716,924

[22] Filed: Aug. 23, 1976

Related U.S. Application Data

[63] Continuation-in-part of Ser. No. 496,788, Aug. 12, 1974, which is a continuation-in-part of Ser. No. 387,100, Aug. 9, 1973, abandoned.

[51] Int. Cl.$^2$ .................. B01J 21/04; B01J 23/60; B01J 23/62; B01J 23/64
[52] U.S. Cl. ................ 252/466 PT; 252/463; 208/138
[58] Field of Search .......... 252/463, 466 PT; 208/138; 423/626, 628, 631

[56] References Cited

U.S. PATENT DOCUMENTS

| | | |
|---|---|---|
| 3,193,348 | 7/1965 | Mooi .................. 252/463 X |
| 3,415,737 | 12/1968 | Kluksdahl .............. 252/466 PT |
| 3,846,343 | 11/1974 | Erickson et al. ......... 252/466 PT |
| 3,900,430 | 8/1975 | Beaty .................. 252/466 J |

*Primary Examiner*—W. J. Shine
*Attorney, Agent, or Firm*—D. A. Newell; R. H. Davies; D. L. Hagmann

[57] ABSTRACT

A method is provided for preparing a porous catalyst carrier having a pore volume of at least 0.5 cc/g, a content of micropores in which the pore diameter is between 80 and 150 A. which constitutes at least 70% of the pore volume and a content of macropores which constitutes less than 3% of the pore volume. In the method, a powdered solid comprised of predominantly alpha-alumina monohydrate and sized in the range below 500 microns is treated with a particular amount of a monobasic acid. The acid in the resulting mixture is then at least partially neutralized by admixing with a nitrogen base such as aqueous ammonia. The treated and neutralized feed is converted into a novel catalyst carrier by shaping as desired, drying, and calcining. Further aspects of the invention are a catalytic reforming catalyst containing the present carrier.

15 Claims, 1 Drawing Figure

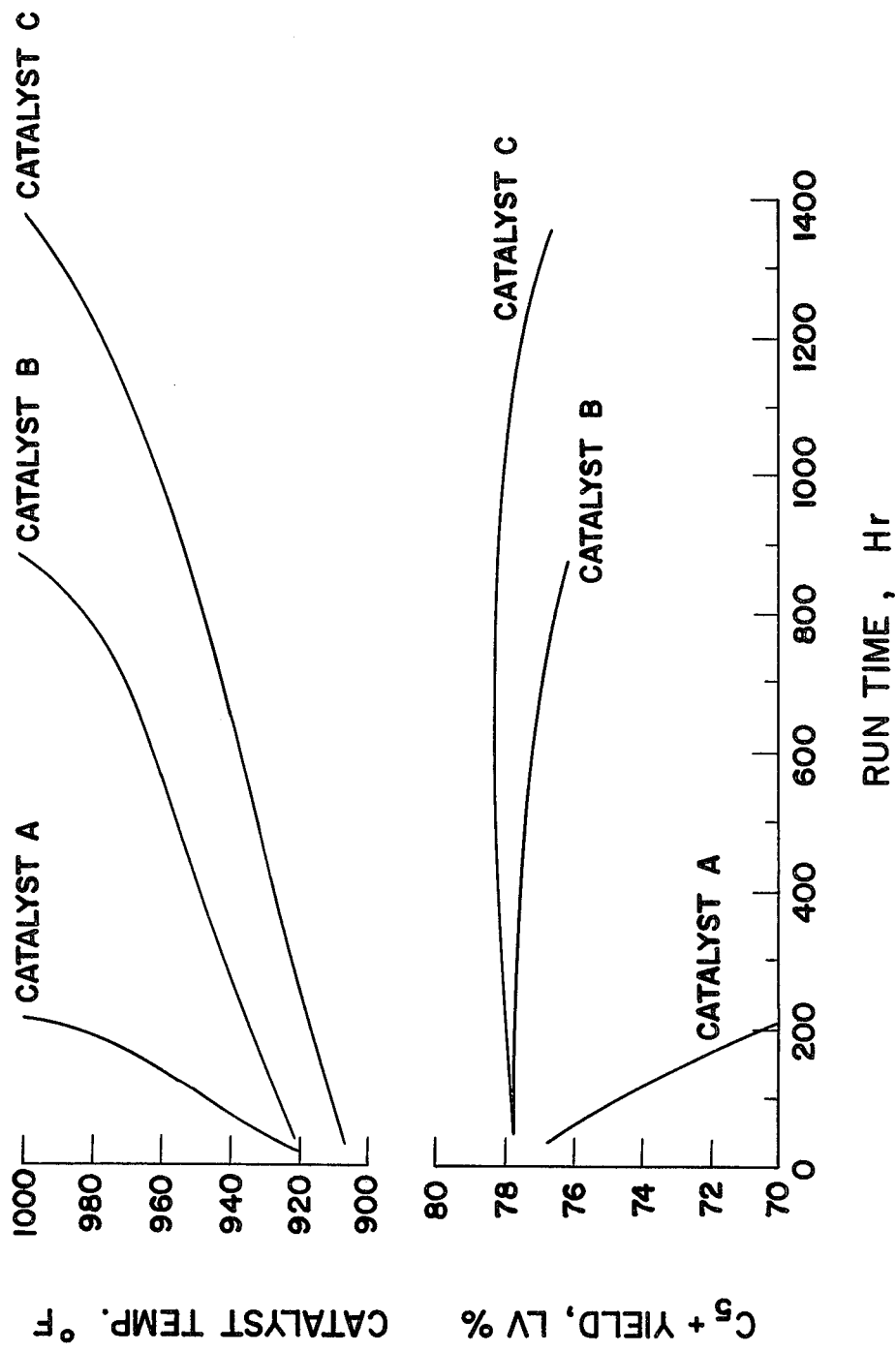

| 4,082,697 |

CATALYST CARRIER, ITS METHOD OF PREPARATION AND A REFORMING CATALYST SUPPORTED ON THE CARRIER

CROSS-REFERENCE TO RELATED APPLICATIONS

This application is a continuation-in-part of my copending application Ser. No. 496,788, filed Aug. 12, 1974, which is a continuation-in-part of my copending application Ser. No. 387,100, (now abandoned) filed Aug. 9, 1973, the disclosures of which are incorporated herein by reference.

BACKGROUND OF THE INVENTION

The present invention relates to a method for the preparation of a catalyst carrier, to the carrier, to a hydrocarbon reforming catalyst containing the carrier. More particularly, it relates to a method for the preparation of a porous hydrocarbon reforming catalyst substantially free of macropores (diameter above 1000 A.) and containing at least one hydrocarbon catalytic reforming component. Still more particularly, it relates to a catalyst which comprises a predominantly alumina carrier component which is substantially free of macropores, has a particular micropore size distribution, and contains at least one catalytic component selected from the group consisting of the Group VIII noble metal catalytic reforming components, especially platinum.

The dwindling world supply of petroleum and the corollary increasing cost of energy emphasizes the need to conserve this supply. This need translates to the need for more stable and selective catalyst, for example, for use in hydroprocessing petroleum to more suitable fuels, particularly, in the production of motor gasoline by catalytic reforming of the usual petroleum-derived reformable hydrocarbon feedstocks. Desirably, such catalysts should be less costly and be less energy demanding in their use in the hydroprocessing than existing catalysts. An object of this invention is to provide a new and improved catalyst for use in catalytic hydroprocessing, especially in the reforming of reformable hydrocarbon feedstocks.

In the catalytic reforming of petroleum feedstocks the use of a catalyst comprising a noble metal catalytic component dispersed on a porous alumina carrier or support is well known, for example the disclosure in U.S. Pat. No. 3,415,737 (Kluksdahl, H. E.) in which the catalytic component is a rhenium stabilized platinum component dispersed upon an alumina carrier. It is true for this catalyst and other contemporary catalytic reforming catalysts that there is substantial room for improvement in the (1) life (lower fouling rate), (2) selectivity (improved aromatic and $C_5+$ product production), (3) process energy requirement (lower utility requirement) and (4) catalyst cost. Thus, while the stabilization of noble metal reforming catalysts by rhenium iridium, tin and the like have in their time provided a material advance over simple noble metal reforming catalysts in the reforming art, this disclosure will make evident the need and an opportunity to improve the carrier and hence the catalyst per se in the case of Group VIII noble metal-containing hydrocarbon reforming catalysts.

Typical operating conditions usually employed in a catalytic hydrocarbon reforming process include (1) a reaction temperature in the range 600° to 1100° F, preferably 700°–1050° F; (2) a pressure in the range from atmospheric to superatmospheric, usually 25 to 1000 psig, preferably 50 to 750 psig; (3) correlation of the temperature and pressure with the liquid hourly space velocity (LHSV), usually in the range 0.1–10, preferably 1–5, to favor any particularly desirable reaction as for example aromatization, isomerization, dehydrogenation or cyclodehydrogenation; and (4) a hydrogen-to-hydrocarbon mol ratio in the range 1 to 10.

SUMMARY OF THE INVENTION

According to the present invention:
(I) a method is provided for preparing a porous catalyst carrier:
  (a) having a pore volume of at least 0.5 cc/g;
  (b) having a content of micropores in the range between about 80 and 150 A. in diameter which constitutes at least 70%, preferably at least 85%, of the pore volume; and
  (c) having a content of macropores (pores having a diameter greater than 1000 A.) which constitutes less than 3% of the pore volume, usually in the range from about 0.1 to less than 3%, by:
    (A) treating a peptizable particulate solid comprising predominantly alpha-alumina monohydrate sized in the range below about five hundred (500) microns by admixing the solid with an aqueous solution of at least one acid selected from the group consisting of nitric, hydrochloric, hydrofluoric and hydrobromic acids, said solution containing an amount of the acid in the range from about 0.02 to 0.20, preferably 0.03 to 0.10, equivalent per formula weight of alumina ($Al_2O_3$);
    (B) neutralizing at least a portion of the admixed acid by admixing into the treated solid an aqueous solution of a nitrogen base, said solution containing an amount of the base in the range from about 0.1 to 1.2, preferably 0.2 to 1, equivalent per equivalent of previously added acid, said neutralized or partially neutralized, treated solid having a volatiles content in the range from about 50 to 70 weight percent; and
    (C) shaping the neutralized or partially neutralized and treated solid; and
    (D) drying and calcining the shaped solid at a temperature in the range from about 150° to 1700° F;
(II) the alumina carrier composition produced by the above method, that is having a total pore volume of at least 0.5 cc/g, a content of micropores sized in the range between about 80 and 150 A., preferably 100–140 A., which constitutes at least 70%, preferably at least about 85% of the pore volume, and having a content of macropores (pores having a diameter greater than 1000 A.) which constitutes less than 3%, usually in the range from about 0.1 to less than 3%, of the pore volume, is provided; and
(III) a catalyst composition comprising a carrier component and a catalytic component is provided, the carrier component being a composition as described in (II) above and the catalytic component being at least one Group VIII noble metal, preferably platinum, the catalytic component being promoted and/or stabilized by at least one material selected from the metals, oxides and halides of the group of elements consisting of rhenium, manganese, germanium, tin, zinc and titanium, preferably rhenium, said promoter and/or stabilizer being present in an amount and form as usual in noble metal hydrocarbon catalytic reforming catalysts which but for the present unique carrier are known in the hydrocarbon reforming art, said composition containing on a dry basis and calculated as metal from about 0.1 to 3 weight percent of the noble metal and of the promoter, and a total halide content in the range 0.1 to 3 weight percent, the balance comprising alumina.

By "hydrocarbon catalytic reforming" as used herein is meant by definition reforming as in the usual production of motor fuel, e.g., gasoline, of improved octane rating from a reformable hydrocarbon feed.

EMBODIMENT

In a preferred method of the present invention, a catalyst carrier is prepared and impregnated in separate stages. To prepare the carrier, alpha-alumina monohydrate powder sized in the range below about 150 microns is treated by thoroughly admixing the powder with an aqueous solution of nitric acid. For each formula weight of the alumina ($Al_2O_3$), about 0.04 equivalent of acid is used for the treatment. The treated alumina powder is in the form of a workable paste.

Following the aqueous acid treatment of the solid, aqueous ammonium hydroxide is thoroughly admixed into the paste in an amount equivalent to about 20% of the ammonium hydroxide theoretically required to completely neutralize the acid added in the above-described treatment; that is, about 0.008 equivalent of the hydroxide is added to the paste per formula weight of the alumina present. The volatiles (material evolved during drying and calcination) content of the treated and neutralized solid should be in the range 50 to 70 weight percent. With the addition and thorough admixing of ammonium hydroxide, the paste changes to a free flowing particulate solid suitable as a feed to an extruder.

An extruder is employed for the shaping of the partially neutralized solid into the precursor for the catalyst carrier. Optionally and to facilitate extruding, a minor amount of a detergent, for example, neodol or the like (see for example U.S. Pat. No. 3,804,781) may be added to the precursor mixture. The extrudate is desirably sized to provide a carrier suitable for use in a hydrocarbon reforming process, for example a diameter of about 1.6 mm and a length of about 3.2 mm.

The formed precursor is freed of loosely held water by an initial, moderate drying step, for example at a temperature in the range from 150° F to 500° F. The preparation of the carrier is then completed by calcining the dried extrudate at a temperature between 500° and 1700° F, preferably about 1250° F, in a dry or humid atmosphere. The resulting carrier has a pore volume of about 0.7 cc/q, of which at least 85% is furnished by pores having a diameter in the range between about 80 and 150 A. Less than about 1.0% of the pore volume is furnished by macropores. The carrier serves as an excellent base for a hydrocarbon reforming catalyst for reforming reformable feedstocks.

Typical reformable hydrocarbon feedstocks are suitable for use herein and are contemplated for such use. Representative feedstocks include naphtha boiling within the limits of from 70° to 550° F, preferably 150°–450° F, and fractions thereof, for example, straight run naphtha, thermally cracked or catalytically cracked naphtha or blends thereof. The feed should be free of sulfur, that is, should contain less than 10 ppmw of sulfur (calculated as the element) and preferably less than 1 ppmw.

PARTICULATE SOLID

In order to avoid the presence of an appreciable (i.e., sufficient macropores to constitute 3% or more of the pore volume) amount of macropores in the carrier and catalyst produced herein, the treated solid phase should be predominantly (i.e., at least 80 weight percent) alpha-alumina monohydrate and contain little (less than 5 weight percent) or none of the other alumina hydrates. Preferably, and for better results, the solid should consist essentially of the monohydrate. For best results, the solid should be at least 99.5% pure alpha-$Al_2O_3$-$H_2O$. Other refractory support materials such as silica and magnesia and the like are satisfactory adjuvants as required to make up the balance of the particulate solid.

A further requirement for the avoidance of undesirable macropore formation in the catalyst herein is related to the particle size of the treated solid. In general, the presence of an appreciable amount of oversized particles in the solid phase leads to the formation of macropores in the carrier. The particle size of the particulate solid should be in the range below about 500 microns, preferably below 150 microns. Alternatively, and where it is inconvenient to determine the sizing of a powdered solid, a dispersion test may be applied to a sample of the treated solid. This test is described below in the section covering suitable acids. Where the test indicates that the particulate solid will be unsatisfactory, then the solid may be made satisfactory by any suitable means of separating and classifying finely divided solids, or preferably by micronizing the solid feed prior to the treating step, for example by ball milling and the like.

The alpha-alumina monohydrate required for the present method is available from a variety of commercial sources. It may also be prepared by partially dehydrating trihydrated alumina by conventional methods. Alpha-alumina monohydrate may be conveniently prepared by precipitation from a hot alum solution by combination with ammonia or sodium aluminate solution (see, for example, J. A. Lewis and C. A. Taylor, "J. App. Chem.", Vol. 8, 1958 and H. Lehl, "J. Phys. Chem.", Vol. 40, 1936). A preferred source is alpha-alumina monohydrate produced from the hydrolysis of an aluminum alkoxide [$Al(OR)_3$, where R is the same or different and is an alkyl group].

SOLID TREATMENT

In order to produce an alumina support or carrier having a pore size distribution in accordance with that required by the present invention, the alpha-alumina monohydrate feed must be treated with a suitable monobasic acid, preferably nitric acid. Other useful acids include the ordinary halogen acids, e.g., hydrofluoric, hydrochloric and hydrobromic acids. Surprisingly, sulfuric and phosphoric ($H_3PO_4$) acids are not satisfactory for the present purposes. In the treatment, an aqueous solution of the acid is thoroughly admixed into the solid. The relative amount of acid required for the treatment varies, apparently depending upon several variables, including the particular acid used, and upon the sizing of the monohydrate solid. Sufficient acid is required to insure that less than 20, preferably less than 10, weight percent (based upon the monohydrate feed) of the treated feed sediments from an aqueous dispersion of the feed after the treatment. Usually a treatment with about 0.02 equivalent of acid per formula weight of alumina is sufficient to make the sedimentation test (see description below). In general, the relative amount of acid required herein is in the range from about 0.02 to 0.20 equivalent, with best results being experienced when the range is from about 0.02 to 0.12 equivalent per formula weight of alumina. Larger relative amounts of acid may be used, but in general such use is undesirable for a number of reasons, including an unnecessarily large salt formation in the following neutralization step, and increased cost.

The dispersion test noted above is a useful and affirmative means for determining that the solid feed is capable of producing a carrier substantially free of macropores. In the test, one part (weight) of the treated solid is added to 4 parts of water, and the resulting mixture is vigorously stirred. The pH of the mixture should be in the range 3.5 to 5.3. For a satisfactory feed and treated feed, there will be less than about 20, preferably less than 10, weight percent (based upon the solid feed) of settled (sedimented) solid when settling is complete, usually within about 10 minutes after the stirring was stopped, the mixture being at ambient temperature.

The concentration of the acid in the solution used for the treatment may vary, and is determined by the volatiles content required for the mix in the acid treatment step. The required volatiles content is determined primarily by the type of mixing equipment employed. Intimate mixing of acid and alumina hydrate is essential.

NEUTRALIZATION

The acid treated feed is satisfactory for the production of a finished carrier substantially free of macropores. However, it is not satisfactory for the production of a catalyst carrier with appropriate pore volume for use in the preparation of the desired reforming catalyst. A satisfactory reforming catalyst carrier and catalyst should have a pore volume of at least about 0.5 cc/g, preferably at least 0.65 cc/g. Within the limits specified herein, surprisingly, the higher the pore volume, provided that the micropore pore distribution and macropore content are satisfactory, the more effective is the catalyst. In order to achieve a useful pore volume and to provide a suitable micropore distribution as required for the finished carrier and catalyst, an appreciable fraction of the admixed acid in the treated feed must be neutralized with a nitrogen base which has been thoroughly admixed into the feed by intensive mixing.

By "nitrogen base" as used herein is meant a base of the formula $R_3N$ and the corresponding hydroxide form, $R_3HNOH$, wherein the R groups are the same or different and are selected from the group consisting of hydrogen and of alkyl groups having a carbon atom content in the range from 1 to 3, inclusive. Aqueous ammonia is preferred.

The amount of the nitrogen base which should be used for the neutralization varies, depending upon a number of factors, including the acid to be neutralized and the nitrogen base to be employed. Ordinarily, for each equivalent of the acid employed in the treatment, at least about 0.1 equivalent of the base is required. The use of a larger relative amount of the base is increasingly beneficial up to a point. Thereafter, the use of a larger relative amount is undesirable. Excellent results in terms of the finished carrier obtain, in general, when the relative amount of the base per equivalent of the acid is in the range from about 0.1 to 1.2 equivalents. When this ratio is about 1.6, the resulting carrier is usually unsatisfactory.

The nitrogen base is desirably added to the treated feed in the form of an aqueous solution. The concentration of this solution may vary over a range. It is determined by the volatiles content required for the particular method of shaping to be employed. (See the definition of volatiles content in the following section). Briefly, by difference there is a definite amount of available water for solution purposes as a vehicle for the acid or nitrogen base herein. Preferably the major portion (55-90%) of this water is added as solvent for the acid in the first treating step. The balance (10-45%) is added as solvent for the nitrogen base. Where aqueous ammonia, the preferred base, is employed for the neutralization, the concentrated ammonia of commerce (e.g., 28% aqueous ammonia) and moderate dilutions thereof are particularly convenient for use herein.

The nature of the mixture resulting from the neutralization of the treated feed varies, depending upon its volatiles content. It may be a flowable solid or a viscous paste. In the preferred form required for use as an extrusion feed, it is a flowable solid having a volatiles content in the range from 50 to 70 weight percent. If a slurry of one part mix and four parts water is prepared at this point, the pH of the slurry will be in the range 5.5 to 7.5.

VOLATILES CONTENT

The "volatiles" as used herein is the material evolved during high temperature ($\leq 900°$ F) drying. Thus volatiles, in general, constitute water, vaporized acid and ammonia and dissociation and/or association products thereof. While all the available water will not be released even upon calcination to 1700° F, very nearly all of the volatiles will be released by 900° F. For practical purposes, the volatiles content may be determined from a summation of the water of hydration of the alumina monohydrate and the acid, ammonia and water added during the acid treatment and neutralization steps. The volatiles content of the mixture at each step in the preparation is dictated primarily by the equipment to be used either for mixing or shaping. The volatiles content during the acid treatment and neutralization steps is itself unimportant so long as thorough mixing is achieved. The volatiles content prior to shaping is again unimportant so far as the invention is concerned, and may vary widely according to the requirement of the shaping procedure to be employed.

SHAPING

A variety of shaping methods may be employed for forming the precursor of the catalyst carrier from the treated and neutralized solid feed. These include tray drying and calcining followed by grinding and screening, pelleting, extruding and the like. Preferably the shaping is effected by extruding. In this event, the neutralization product should have a volatiles content in the range from about 50 to 70 weight percent, preferably 55 to 65 weight percent. The dimensions in general of the finished carriers are intended to be those ordinarily employed in the petroleum processing art, including those normally employed for fixed-bed and slurry-bed operations.

DRYING AND CALCINING

In the production of the finished carrier, drying and calcining steps of the present method are in general carried out at temperatures in the range from about 150°

F to 1700° F. The shaped carrier precursor is freed of uncombined and loosely held water by an initial, moderate heating, for example at a temperature in the range from 150° to 500° F. Following the drying, the calcination is carried out in a dry or humid atmosphere at a temperature in the range from about 500° to 1700° F, preferably about 1250° F.

The present method results in the production of moderate-to-low density, predominantly alumina, catalyst carriers having greater than 97% of their pore volume in the micropore region; and, in the preferred mode usually results in carriers having approximately 99% of their pore volume in the micropore region.

It is preferred to use a catalyst made from an alumina carrier having greater than 70% of its total pore volume in pores 80 to 150 A., and more preferably 100 to 140 A., in diameter and less than 3% of its total pore volume in pores having a diameter greater than 1000 A.; more preferably yet, less than 1% of its total pore volume in pores greater than 1000 A. in diameter. Complete avoidance of macropore production in the preparation of the carrier herein is desirable but is most difficult. Usually the carriers herein have a macropore content which is in the range from about 0.1 to less than 3% of the pore volume. Comprehensive preferred pore-size distributions are given in Table I below:

TABLE I

| | Pore Volume cc/g | Preferred Pore Size Distribution[1] For Catalyst Support % of Total Pore Volume In Pore Diameter, Angstroms | | | | |
|---|---|---|---|---|---|---|
| | | <80 | 80–150 | 100–140 | 150–1000 | >1000 |
| Broader preferred range | 0.5–1.1 | <20 | >70 | — | <20 | <3 |
| Narrower preferred range | 0.65–0.85 | <10 | 85 | >65 | <5 | <1 |

[1]Determined by the mercury porosimetry method.

The pore-size distributions herein are in respect to the support, not the finished catalyst, because the pore-size distributions for the support are more conveniently determined than for the catalyst. However, the pore-size distribution of the finished catalyst is substantially similar (little or no difference within the limits of the accuracy of the determination) to the pore-size distribution of the alumina support onto which the active metals are impregnated. Pore-size distributions for the alumina used in the process of the present invention were obtained using mercury porosimetry, which technique is described by Winslow and Shapiri in "An Instrument for Measurement of Pore Size Distribution by Mercury Penetration", ASTM Bulletin, February 1959. Mercury contact angle in the pore is particularly important in pore-size distribution calculations based on mercury penetration data. One reason the support is preferably used as the basis for defining pore-size distributions is that contact angles involved in calculation of pore-sizes can vary after impregnation of metals with the amount and type of metals impregnated onto the support, so that the calculation of pore-sizes is somewhat less reproducible for the finished catalyst as opposed to the alumina support. A contact angle of 140° was assumed in calculating all the pore-size distributions referred to herein. For purposes of the present invention, catalyst support pore-sizes are to be determined by a mercury porosimeter using a contact angle of 140° in the pore-size calculation;

CATALYST PREPARATION

The catalyst carriers of the present invention are useful, in general, as supports for the preparation of hydrocarbon-processing catalysts for which an alumina-type support is desirable. These carriers are especially suitable for use in the preparation of promoted Group VIII noble metal hydrocarbon reforming catalysts. The carrier after the calcining thereof is impregnated with the noble metal component and promoter component by any suitable and usual method. That is, but for the use of the unique carrier component herein, the preparation of the catalyst composition herein may be effected by ordinary or usual carrier impregnation or coimpregnation methods known for the production of Group VIII promoted noble metal catalysts. Representative descriptions of these methods, include the descriptions in U.S. Pat. No. 2,838,375 (Teter, J. W., et al); U.S. Pat. No. 3,846,343 (Erickson, H., et al); and U.S. Pat. No. 3,415,737 (Kluksdahl, H. E.) and the like disclosures.

In a representative preparation of the present catalyst composition, the calcined carrier is coimpregnated by the pore fill method with an aqueous solution of chloroplatinic, perrhenic and hydrochloric acids sufficient to provide a dried composition containing, calculated as metal, 0.3 weight percent each of platinum and rhenium and 1.7 weight percent of chloride. After drying, the impregnated solid is calcined in a conventional manner.

EXAMPLES 1–3

CARRIER PREPARATION

The following comparative examples are offered by way of illustration and not by way of limitation of the invention.

In the example below, Carriers I, II and III were prepared. The solid feed was an alpha-alumina monohydrate having a particle size in the range below about 150 microns, a volatiles content of about 25 weight percent. In each case the feed was extruded (one-sixteenth inch nominal-sized extrudate), dried for 2 hours at about 400° F in a stream (20 ft.³ per hour) of dry air, and calcined by raising the temperature to 1500° F and continuing the stream of dry air for 4 hours. In Table II are listed the relative amounts of the components employed for the carrier preparations, and in Table III the porous properties of the finished carriers are listed.

TABLE II

| Carrier | I | II | III |
|---|---|---|---|
| Solid Feed, g | 500 | 500 | 500 |
| $Al_2O_3$, g | 375 | 375 | 375 |
| $H_2O$, g | 125 | 125 | 125 |
| Water, g | 345 | 360[1] | 345 |
| Nitric Acid,[2] ml | 7 | 1.35 | 20 |
| $HNO_3$, g | 7 | 1.35 | 20 |
| $H_2O$, g | 3 | 0.55 | 8 |
| Aqueous Ammonia | No | No | Yes |
| $NH_3$, g | | | 4.3 |
| $H_2O$, g | | | 212[3] |
| Extrudate Volatiles Content, wt% | 56 | 56 | 66 |

[1]Contained 8 g of glyceride, an extrusion aid.
[2]Specific gravity 1.42 g/cc
[3]Includes 175 ml of water required to bring volatiles content to a level appropriate for extrusion.

TABLE III

POROUS PROPERTIES OF ALUMINA CARRIERS PREPARED FROM ALPHA ALUMINA MONOHYDRATE

| Carrier | Particle Density g/cc | Pore Volume cc/g | Percent of Total Pore Volume In Pores of Diameter | | | |
|---------|----------------------|------------------|------|--------|---------|--------|
| | | | <80A | 80–150A | 150–1000A | >1000A |
| I   | 1.46 | 0.406 | 74.2 | 23.5 | 2.0 | 0.3 |
| II  | 1.31 | 0.495 | 27.2 | 55.5 | 6.5 | 10.8 |
| III | 1.06 | 0.701 | 3.1  | 94.7 | 2.1 | 0.1 |

The foregoing carrier examples (I, II and III) are useful for illustrating the present invention. Carrier I has a high density (about 1.5 g/cc) and too large a content of pores having a pore diameter below 80 A. The content of pores having a diameter below 80 A. is also unacceptable for Carrier II, and its macropore content exceeds 3%. Surprisingly, as demonstrated by Carrier III, the sequential use of a relatively large amount of the acid and an amount of ammonium hydroxide equivalent to 80% neutralization of the acid results in very different porous properties. Only Carrier III conforms to all of the specifications required for an improved catalyst carrier described herein.

EXAMPLE 4

Representative carriers especially suitable for use in the preparation of the reforming catalyst herein were prepared as in Examples 1–3 except that (1) the mol ratios of nitric acid to alumina were 0.03 to 0.045, respectively and (2) the equivalent ratios of ammonia to nitric acid were 0.15 to 0.35, respectively, in the neutralizing step of the carrier preparation. The resulting carriers had exceptional pore size distributions and yield superior reforming catalysts. The pore size distribution for the carriers (designated Catalysts C, C' and C") is compared with the carrier for a conventional reforming catalyst (Catalyst B) in the Table IV below:

TABLE IV

| CATALYST | % of Total Pore Volume[1] | | | |
|----------|------|------|------|------|
| | C | C' | C" | B |
| Total Pore Vol., cc/g | .68 | .67 | .79 | .60 |
| Pore Dia. Range, A. | | | | |
| 0–40     | ~0   | ~0   | ~0   | ~0   |
| 40–50    | ~0   | ~0   | 1.5  | ~0   |
| 40–60    | 0.5  | ~0   | 2.0  | ~0   |
| 40–70    | 1.5  | 1.5  | 4.0  | 3.5  |
| 40–80    | 4.5  | 3.5  | 7.0  | 9    |
| 40–90    | 9.5  | 7.5  | 11   | 33.5 |
| 40–100   | 15.5 | 10.5 | 14   | 60   |
| 40–110   | 31   | 16.5 | 18.5 | 76.5 |
| 40–120   | 78   | 34.5 | 29   | 78.5 |
| 40–130   | 91   | 79   | 56.5 | 79   |
| 40–140   | 93.5 | 89.5 | 60.5 | 79   |
| 40–150   | 94   | 92   | 85   | 79   |
| 40–300   | 96.5 | 99   | 95   | 81   |
| 40–1000  | 99   | 99   | 98.5 | 83.5 |
| 80–150   | 89.5 | 88.5 | 78   | 70   |
| 100–140  | 78   | 79   | 46.5 | 19   |
| >1000    | 1    | 1    | 1.5  | 16.5 |

BRIEF DESCRIPTION OF THE DRAWINGS

The FIGURE is a comparison of the catalyst of the invention herein with two conventional catalysts in terms of catalyst life and the liquid volume percent yield of $C_5+$ product.

In the following examples are shown data comparing performances of three reforming catalysts (1) a monometallic platinum (Catalyst A) catalyst, (2) a conventional rhenium promoted (Catalyst B) catalyst, and (3) a catalyst of the present invention (Catalyst C). Each of the latter two catalysts contains 0.3 weight percent each of platinum and rhenium and is supported on an alumina carrier. The supports for Catalysts A and B are conventional alumina carriers with porous properties like Example B, Table IV, whereas that for Catalyst C is the new alumina carrier with porous properties like Example C, Table IV.

EXAMPLES 5–7

In these examples a mid-continent heavy naphtha feed is subjected to an accelerated life test at 200 psig pressure making 102 research octane number (RON) clear reformate. The results for each catalyst tested are shown in FIG. 1.

These data show that a monometallic platinum catalyst, Catalyst A, deactivates rapidly and shows a large decline in $C_5+$ liquid yield with time on-stream. The addition of promoting and/or stabilizing amounts of rhenium to the platinum results in improved run lengths, by as much as a factor of 4 for Catalyst B and by as much as a factor of 6 for Catalyst C. The latter catalyst also exhibits, in general, over Catalyst B somewhat superior $C_5+$ liquid yield and because of its better yield stability a substantially higher run-average yield of liquid product. A further advantage of the Catalyst C over Catalysts A and B is a cost factor. The Catalyst C has a lower density than either of the Catalysts A or B. Therefore, the cost for platinum and rhenium per unit of catalyst-loaded reactor volume is less where Catalyst C is used. The superiority of Catalyst C, providing less noble metal per unit of reactor volume, is truly unexpected.

The above examples demonstrate advantages provided to the reforming art through the use of the new and improved catalyst herein, including (1) improved selectivity, (2) longer life (a lower fouling rate) and (3) reduced catalyst cost. There are relative performance advantages for the present catalyst because of its excellent stability and selectivity, especially in the case of a newly designed reforming plant where advantage may be taken of the effective reforming operation in the 100 to 500 psig range.

What is claimed is:

1. A method for preparing a porous catalyst carrier which comprises:
   (a) treating a peptizable particulate solid comprising predominantly alpha-alumina monohydrate sized in the range below about 500 microns by admixing the solid with an aqueous solution of at least one acid selected from the group consisting of nitric, hydrochloric, hydrofluoric and hydrobromic acids, said solution containing an amount of the acid in the range from about 0.02 ot 0.20 equivalent per formula weight of the alumina;
   (b) neutralizing at least a portion of the admixed acid by admixing into the treated solid an aqueous solution of a nitrogen base selected from the group of the formula $R_3N$ and the corresponding hydroxide $R_3HNOH$, wherein said R groups are the same or different and are selected from the group consisting of hydrogen and of alkyl groups having a carbon atom content in the range from 1 to 3, inclusive, said solution containing an amount of the base in the range from about 0.1 to 1.2 equivalents per equivalent of said acid;
   (c) shaping the neutralized or partially neutralized solid; and (d) drying and calcining the shaped solid in a dry or humid atmosphere at a temperature in the range from about 150° to 1700° F, said dried and calcined carrier having (1) a pore volume of at least 0.5 cc/g, (2) a content of micropores in the range between about 80 and 150 A in diameter constituting at least 70% of said pore volume, and (3) a content of pores having a diameter greater than 1000 A constituting from about 0.1 to less than 3% of said pore volume, said pore-sizes corresponding to sizes determined by the mercury porosimetry method.

2. A method in accordance with claim 1 wherein said particulate solid is sized in the range below about 150 microns, said acid is nitric acid which is admixed in an amount in the range from about 0.03 to 0.10 equivalent per formula weight of alumina, said base is aqueous ammonia, and said resulting carrier has a pore volume of at least about 0.65 cc/g.

3. A method in accordance with claim 2 wherein said neutralized or partially neutralized solid has a volatiles content in the range from about 50 to about 70 weight percent, and said shaping is effected by extruding the solid.

4. A method in accordance with claim 2 wherein said particulate solid consists essentially of alpha-alumina monohydrate.

5. A method in accordance with claim 1 wherein the resulting carrier has a pore volume of at least 0.5 cc/g in which at least 80% of the pore volume constitutes pores having a pore diameter in the range between 100 and 140 A.

6. A method in accordance with claim 5 wherein less than about 1.0 volume percent of the pore volume of the resulting carrier constitutes pores having a pore diameter greater than 1000 A.

7. A predominantly alumina carrier prepared by the method of claim 1.

8. A predominantly alumina carrier prepared by the method of claim 5.

9. A catalytic reforming catalyst composition comprising a carrier component and a catalytic component, said carrier component comprising predominantly alumina having (1) a pore volume of at least 0.65 cc/g, (2) a content of micropores sized in the range between 80 and 150 A in diameter constituting at least 70% of said pore volume and (3) a content of pores having a diameter greater than 1000 A constituting from about 0.1 to 3% of said pore volume, said pore-sizes corresponding to sizes determined by the mercury porosimetry method; said catalytic component being at least one Group VIII noble metal promoted and/or stabilized by at least one material selected from the metals, oxides and halides of the group of elements consisting of rhenium, manganese, germanium, tin, zinc and titanium; said composition containing on a dry basis and calculated as metal, in addition to said alumina, an amount in the range from about 0.1 to 3 weight percent of said noble metal, and an amount in said range of said promoter.

10. A composition as in claim 9 further characterized in that said micropores are sized in the range 100 to 140 A.

11. A composition as in claim 10 further characterized in that said carrier consists essentially of alumina, said noble metal is platinum and said promoter is rhenium.

12. A catalyst carrier suitable for use in preparing an improved catalytic hydrocarbon reforming catalyst, said carrier consisting essentially of alumina having (1) a pore volume of at least 0.5 cc/g, (2) a content of micropores sized in the diameter range between 80 and 150 A. constituting at least 70% of said pore volume, and (3) a content of pores sized in the diameter range above 1000 A. constituting at least 0.1 and less than 3% of said pore volume, said pore sizes corresponding to sizes determined by the mercury porosimetry method.

13. A carrier as in claim 12 further characterized in that said micropores are sized in the 100 to 140 A. range.

14. A method as in claim 3 wherein said volatiles content is in the range of from about 55 to 65 weight percent.

15. A carrier as in claim 12 wherein said content of said micropores is at least 85 percent.

* * * * *